United States Patent [19]

Sauvageot et al.

[11] Patent Number: 4,932,492

[45] Date of Patent: Jun. 12, 1990

[54] STEERING MECHANISM WITH VARIABLE GEAR REDUCTION CONTROLLED BY THE SPEED OF THE VEHICLE

[75] Inventors: Jean-Claude Sauvageot, Rueil-Malmaison; Dany Desrus, Meudon, both of France

[73] Assignee: Regie Nationale des Usines Renault, Boulogne Billancourt, France

[21] Appl. No.: 269,442

[22] Filed: Nov. 10, 1988

[30] Foreign Application Priority Data

Nov. 10, 1987 [DE] Fed. Rep. of Germany ...... 87 15528

[51] Int. Cl.$^5$ ............................................. B62D 5/04
[52] U.S. Cl. ................................ 180/79.1; 74/388 PS
[58] Field of Search ................ 180/79.1, 79.3, 79; 74/388 PS, 394

[56] References Cited

U.S. PATENT DOCUMENTS

| 4,556,116 | 12/1985 | O'Neil | 180/79.1 |
| 4,650,019 | 3/1987 | Yanai et al. | 180/79.1 |

FOREIGN PATENT DOCUMENTS

| 2563795 | 5/1984 | France. | |
| 2552387 | 3/1985 | France | 180/79.1 |
| 2579547 | 10/1986 | France | 180/79.1 |
| 0023869 | 1/1987 | Japan | 180/79.1 |

Primary Examiner—David M. Mitchell
Assistant Examiner—Wook Yoon
Attorney, Agent, or Firm—Oblon, Spivak, McClelland, Maier & Neustadt

[57] ABSTRACT

A steering mechanism with variable gear reduction controlled by the speed of the vehicle of the type is disclosed which includes an electric motor for driving an element for adjusting the gear reduction ratio and whose power supply is controlled by the speed of the vehicle, characterized by the fact that the steering column includes an input shaft (1) and output shaft (2) to which are rigidly connected input pinions (4) and output pinions (5) meshed with planet pinions (6, 8-7, 9) of a planet carrier (10) which extends axially by a hub (11) placed concentrically to one of the shafts (1, 2) on which is mounted an element (12) for driving and regulating the gear reduction ratio actuated by a variable speed electric motor (13).

2 Claims, 1 Drawing Sheet

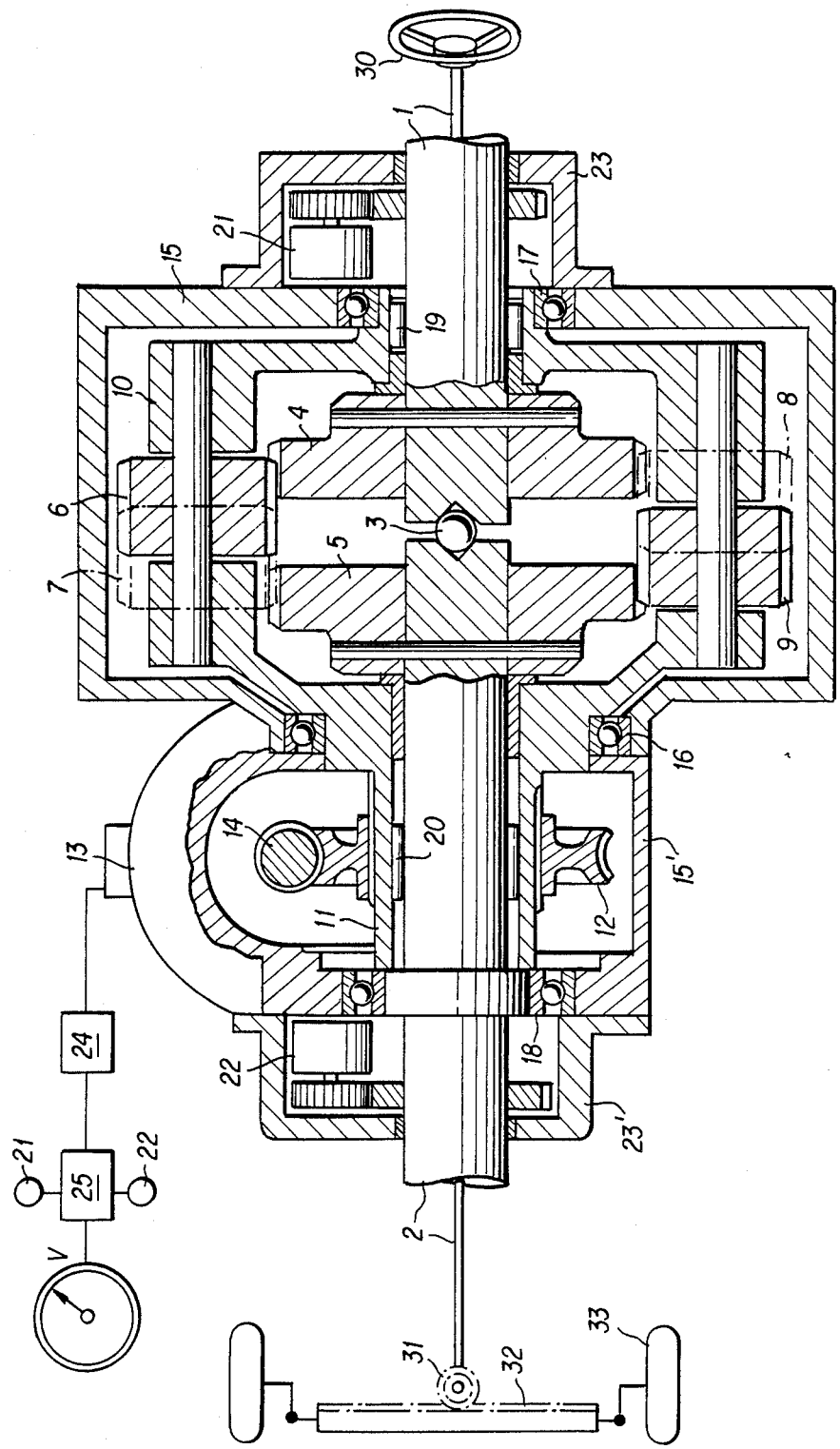

STEERING MECHANISM WITH VARIABLE GEAR REDUCTION CONTROLLED BY THE SPEED OF THE VEHICLE

BACKGROUND OF THE INVENTION

1. Field of the Invention

The invention relates to a steering mechanism with variable gear reduction in which the transmission of rotational movement of the steering wheel to the control connecting rods of the pivot pins of the wheels is modified by the speed of movement of the vehicle and in which the rotation of the steering wheel is translated by a slight movement of the control connecting rods at high speeds and by an increased movement of said connecting rods when the speed of the vehicle is low.

2. Discussion of the Background

A mechanism is disclosed known by publication DE-A 2 507 252 in which an electric motor is supplied from an amplifying comparator of the speed signals and of movement and drives an actuating screw of an element for regulating the gear reduction ratio.

For this purpose, the regulating element consists of a carriage mounted with linear movement under the action of the actuating screw along a jointed arm carrying the control connecting rods of the wheel pivot pins to achieve direct control of the wheel pivot pins at low speeds of the vehicle and gear reduction control at higher speeds under the effect of a controlled modification of the kinematics of the mechanism.

Publication FR-A 2 488 360 describes a steering mechanism in which a torque motor provides to a steering column, by a sun and planet gear, an additional boosting force to the control force communicated to the steering wheel without the possibility of modification of the gear reduction ratio of the mechanism.

The problem posed by this prior art resides in the fact that a desired gear reduction ratio of the steering mechanism is difficult to obtain with sufficient accuracy when the adjustment elements of the mechanism have linear or oscillating movements intended to modify the kinematics of the mechanism.

SUMMARY OF THE INVENTION

From said prior art, the invention proposes a solution to the problem mentioned and relates more particularly to a mechanism characterized in that the steering column comprises, in a way known in the art, an input and output shaft to which are rigidly connected input and output pinions in mesh with planet pinions of a planet carrier which extends axially by a hub placed concentrically to one of the shafts on which is mounted an element for driving and adjusting the gear reduction ratio, actuated by a variable speed electric motor.

According to the preferred embodiment of the invention, the electric servomotor is fed by the output signal delivered by a comparator of signals in response to the input signals provided by a sensor of the speed of the vehicle and by sensors of the angular position of the input and output shafts in the casing of the mechanism.

BRIEF DESCRIPTION OF THE DRAWINGS

Other characteristics and features of the invention will be understood the following from description of an embodiment with reference to the accompanying drawing in which the figure is a view in longitudinal section of the mechanism in which the elements of the steering mechanism and the automatic control servomotor have been represented.

DESCRIPTION OF THE PREFERRED EMBODIMENT

According to the figure, the steering column consists of two sections materialized by an input shaft 1 and an output shaft 2. Input shaft 1 is actuated by steering wheel 30 while output shaft 2 carries pinion 31 that controls rack 32 for actuating the steering-knuckle pivot pins of steered wheels 33 of the vehicle. A ball 3 inserted between shafts 1, 2 assures their alignment.

Input pinions 4 and output pinions 5 are ridigly mounted on shafts 1, 2. Pinions 4 and 5 are respectively meshed with two sets of planet pinions 6, 8 and 7, 9 mounted to rotate on pins carried by a planet carrier 10, planet pinions 6, 8 of the first set being respectively meshed with planet pinions 7, 9 of the second set.

The planet carrier extends axially by a hub 11 placed concentrically around shaft 2 on which is mounted a drive gear 12 receiving the torque of a variable speed electric servomotor 13 by an endless screw 14 which regulates the gear reduction ratio.

The entire mechanism consisting of pinions 4, 5 and of planet carrier 10 is mounted in a split housing 15. Bearings 16, 17, 18 allow the rotation of planet carrier 10 and that of shaft 2 in housing 15.

Furthermore, shafts 1, 2 have needle bearing contacts 19, 20 which promote the rotation of said shafts in the planet carrier and in hub 11.

Sensors 21, 22 of the angular position of shafts 1, 2 are respectively mounted in covers 23, 23' fastened to housing 15 and to its fraction 15' which contains gear 12 and control screw 14. Furthermore, a sensor V of the speed of the vehicle delivers signals together with sensors 21, 22.

When the vehicle is stopped (zero vehicle speed), the operation of steering wheel 30 is transmitted by pinion 4 to planet pinions 6, 8. A power stage 24 is actuated by the signals from sensors 21, 22 and delivers a control voltage to servomotor 13. Planet carrier 10 turns in the direction necessary for the amplification of the angular movement of shaft 2. The actuating torque of shaft 1 is transmitted to shaft 2 by pinion 4, from the various planet pinions and from pinion 5.

Under these conditions, the mechanism acts like a step-up gearing and makes it possible to obtain a quick modification of the orientation angle of wheels 33 of the vehicle.

When the vehicle is moving, power stage 24 is fed by the signals from sensors 21, 22 and by a speed signal that can vary. The voltage of servomotor 13 consequently varies and planet carrier 10 turns in the direction necessary for a reduction of the amplification ratio of the angular movements of shaft 2.

Under these conditions, the mechanism acts like a gradual gear reducer and makes it possible to reduce the speed by variation of the orientation angle of the wheels during the operation of the steering wheel.

From a certain speed of the vehicle (for example, 60 km/hr) servomotor 13 automatically stops and the movements of shaft 1 are transmitted integrally to shaft 2, the gear reduction being determined by the rack-and-pinion system.

Thus, it can be seen that the angular movements of shaft 2 vary in relation to the movements of shaft 1, so that there is a gear reduction of the mechanism measured by ratio k of the instantaneous angular movements of shafts 1 and 2. The magnitude of the signals delivered by sensors 21 and 22 defines the instantaneous value of ratio k which can in that way constitute the automatic disengaging parameter or the stopping of motor 13.

In practice, the representative signals of the speed of the vehicle of the movement angle of steering wheel 30 and of the movement angle of steering shaft 2 are processed by measuring unit 25.

The instantaneous value of ratio k is compared to a reference value ko that can vary as a function of the speed of the vehicle, and an error signal E controls power stage 24 having a switch function whose output voltage assures the disengagement, the stopping and the speed variation of motor 13 as long as error signal E exists.

A wheel and screw system using gear 12 and screw, 14 exhibits the advantage of causing planet carrier 10 to turn independently of the movements of the steering wheel.

Likewise if the operation of motor 13 or of a control element (sensor) is defective, planet carrier 10 remains locked and the vehicle remains operable with a high gear reduction ratio regardless of the speed of the vehicle.

Obviously, numerous modifications and variations of the present invention are possible in light of the above teachings. It is therefore to be understood that within the scope of the appended claims, the invention may be practiced otherwise than as specifically described herein.

We claim:

1. A steering mechanism with variable gear reduction controlled by the speed of the vehicle of the type, comprising:
    an electric motor for driving an element for adjusting the gear reduction ratio and whose power supply is controlled by the speed of the vehicle;
    a steering column which comprises an input shaft and an output shaft to which are respectively rigidly connected input pinions and output pinions, a planet carrier having planet pinions meshed with said input pinions and said output pinions;
    a hub axially extending from said planet carrier, said hub being concentrically positioned with respect to one of said shafts;
    an element mounted on said hub concentrically with one of said shafts for driving and regulating the gear reduction by moving the planet carrier ratio; and
    wherein said electric motor is a variable speed electric motor for actuating said element for driving and regulating the gear reduction ratio.

2. A steering mechanism according to claim 1, wherein the electric motor is fed in response to the input signals provided by a sensor for sensing the speed of the vehicle and sensors for sensing the angular position of the shafts.

* * * * *